United States Patent
Pichumani et al.

(10) Patent No.: US 12,261,318 B2
(45) Date of Patent: Mar. 25, 2025

(54) TECHNOLOGIES FOR BATTERY RETENTION

(71) Applicant: Intel Corporation, Santa Clara, CA (US)

(72) Inventors: Prasanna Pichumani, Bangalore (IN); Jagadish Vasudeva Singh, Bangalore (IN); Prakash Kurma Raju, Bangalore (IN); Vinay Kumar Chandrasekhara, Bangalore (IN); Arvind Sundaram, Bangalore (IN); Naoki Matsumura, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 17/213,386

(22) Filed: Mar. 26, 2021

(65) Prior Publication Data

US 2021/0218102 A1  Jul. 15, 2021

(51) Int. Cl.
| | |
|---|---|
| *H01M 50/264* | (2021.01) |
| *H01M 50/242* | (2021.01) |
| *H01M 50/244* | (2021.01) |
| *H01M 50/247* | (2021.01) |

(52) U.S. Cl.
CPC ....... *H01M 50/264* (2021.01); *H01M 50/242* (2021.01); *H01M 50/244* (2021.01); *H01M 50/247* (2021.01)

(58) Field of Classification Search
None
See application file for complete search history.

(56) References Cited

U.S. PATENT DOCUMENTS

| | | | | |
|---|---|---|---|---|
| 4,367,572 A | * | 1/1983 | Zielenski | H01M 50/264 267/74 |
| 5,975,481 A | * | 11/1999 | Hirano | H01M 50/202 429/96 |
| 8,119,271 B1 | * | 2/2012 | Bruce | H01M 50/24 429/185 |
| 2012/0121944 A1 | * | 5/2012 | Yamamoto | H01M 50/124 429/7 |
| 2019/0198830 A1 | * | 6/2019 | Kawakami | H01M 10/0481 |
| 2020/0020904 A1 | * | 1/2020 | Takatsuji | H01M 50/264 |

FOREIGN PATENT DOCUMENTS

| | | | | |
|---|---|---|---|---|
| CN | 207459019 U | * | 6/2018 | ............ H01M 50/20 |
| JP | 2008140757 A | * | 6/2008 | |
| JP | 2009087541 A | * | 4/2009 | .......... H01M 2/1016 |

OTHER PUBLICATIONS

Machine Translation of CN-207459019-U (Year: 2018).*
Machine Translation of JP-2008140757-A (Year: 2008).*
Machine Translation of JP-2009087541-A (Year: 2009).*
Dell™ Latitude™ D620 User's Guide; 102 pages (Year: 2006).*

* cited by examiner

Primary Examiner — Gregg Cantelmo
(74) Attorney, Agent, or Firm — Alliance IP, LLC (57) ABSTRACT

Techniques for battery retention are disclosed. In the illustrative embodiment, a thin polyurethane strap is used to hold a battery in place. The strap only requires a small amount of volume, allowing for a higher volume (and higher capacity) for the battery. In order to accommodate swelling, a computing device that has a battery held in place with such a strap can have an open area above the battery. The strap may have ridges to contact the battery and the component above the battery beyond the open area. If the battery swells, the ridges may be pressed down, accommodating the swelling battery.

18 Claims, 7 Drawing Sheets

TECHNOLOGIES FOR BATTERY RETENTION

BACKGROUND

Battery capacity is an important specification of many devices such as cell phones, tablets, and laptops. Battery capacity is limited by the relatively small volume available in such devices. Additionally, batteries must be securely positioned in the device to protect against puncture or other damage during mechanical shocks. Adhesives, plastic frames, or other battery retention mechanisms take up volume, reducing the available volume for the battery.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Efficient use of space in mobile devices is important in order to improve various performance metrics such as battery capacity. Batteries can be retained using, e.g., screwed-down clips, adhesives. However, screws require volumetric space that cannot be taken up by the battery. Even the thickness of adhesives can limit battery volume by an appreciable amount.

Figure 1:
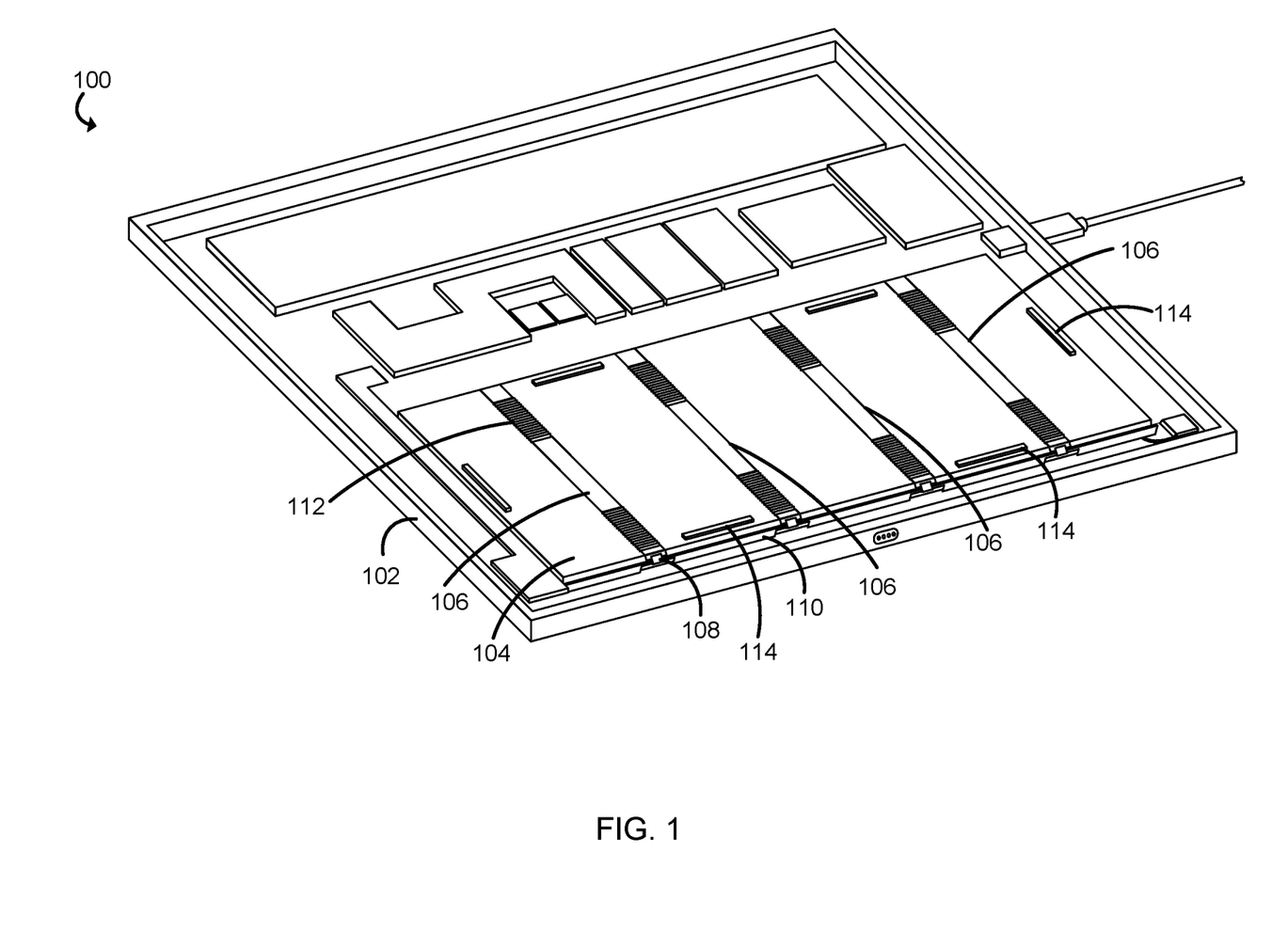
FIG. 1 illustrates a block diagram of one embodiment of a computing device with straps to hold a battery in place.

Referring now to FIG. 1, in the illustrative embodiment, a computing device 100 includes a chassis 102 and a battery 104. The battery 104 is held in place by one or more straps 106 extending along a surface of the battery 104 to hold the battery in place in the chassis 102. Each of the straps 106 has a clip 108 on the end of it to mate with a bracket 110. It should be appreciated that the straps 106 can be relatively thin, such as less than 100 micrometers thick, allowing for the battery 104 to have a larger volume.

Figure 2:
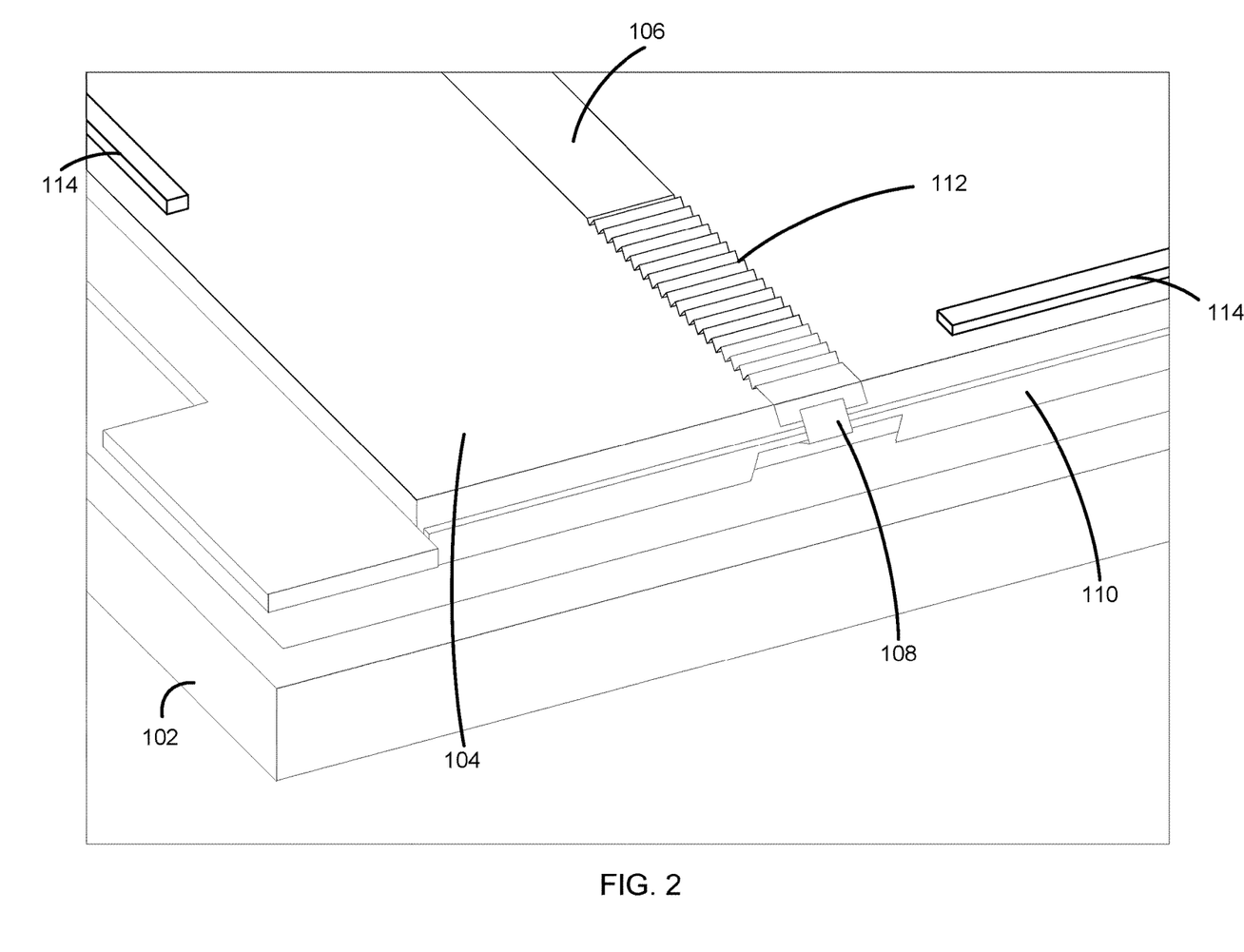
FIG. 2 illustrates a zoomed-in view of the computing device of claim 1.
Figure 3:
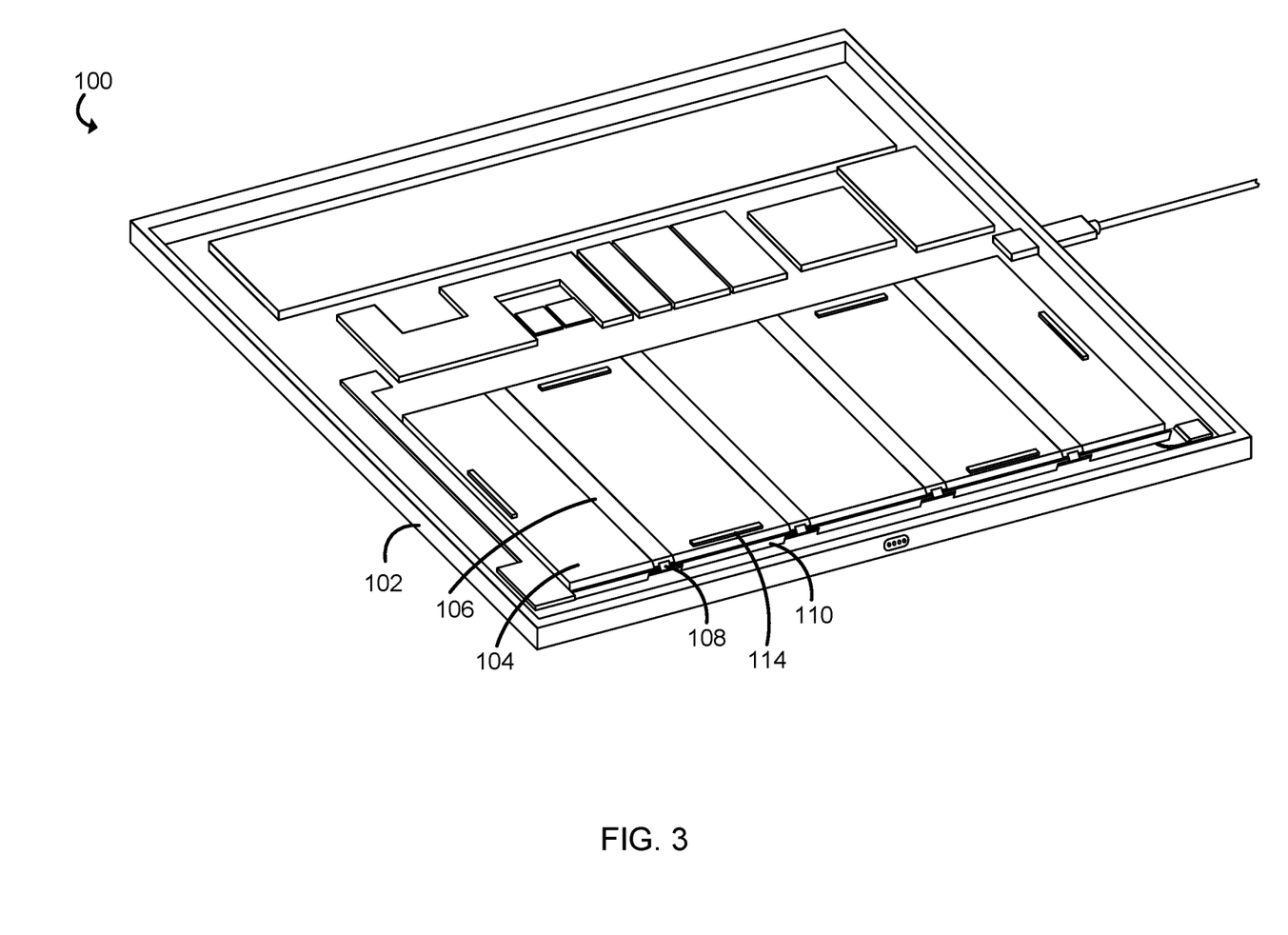
FIG. 3 illustrates a block diagram of the computing device of FIG. 1 with straps to hold a swollen battery in place.

In the illustrative embodiment, the computing device 100 has space for the battery 104 to swell, which may happen due to aging or improper charging. Allowing space for the battery 104 to swell can reduce the safety hazard that may otherwise be caused by the battery swelling 104. In the illustrative embodiment, the straps 106 include ridges 112. The ridges 112 are more clearly visible in FIG. 2, which is a zoomed-in view of a portion of FIG. 1. In the illustrative embodiment, the ridges 112 are V-shaped serrations. In other embodiments, the ridges 112 may have a different shape. For a battery that is not swollen, the ridges 112 mechanically couple the battery to the component on top of the battery 104 (i.e., to the component across the empty space above the battery 104). If the battery 104 swells, the ridges 112 deform under pressure, forming a smooth (or at least partially smoothed) strap 106, as shown in FIG. 3. It should be appreciated that the straps 106 as well as the battery 104 can be replaced. The used battery 104 to be replaced may be faulty, may have a low charge capacity, or otherwise be in need of change. When replacing a swollen used battery 104 that has caused the ridges 112 to be smoothed out, a new strap 106 with ridges 112 can replace the smooth used strap 106.

In some embodiments, energy-absorbing gaskets 114 are positioned around the edge of the battery 104 to absorb impacts or shocks. In the illustrative embodiment, the gaskets 114 are on the same side of the battery 104 as the straps 106. In other embodiments, the gaskets 114 may be on the opposite side of the battery 104 as the straps 106. In the illustrative embodiment, gaskets 114 are not placed in the center region of the battery 104. It should be appreciated that, in the illustrative embodiment, the battery 104 swells in the center region but does not swell around the edges. As a result, the gaskets 114 do not interfere with the battery 104 as it swells. In the illustrative embodiment, the gaskets 114 are attached to the battery 104 with, e.g., an adhesive.

Figure 4:
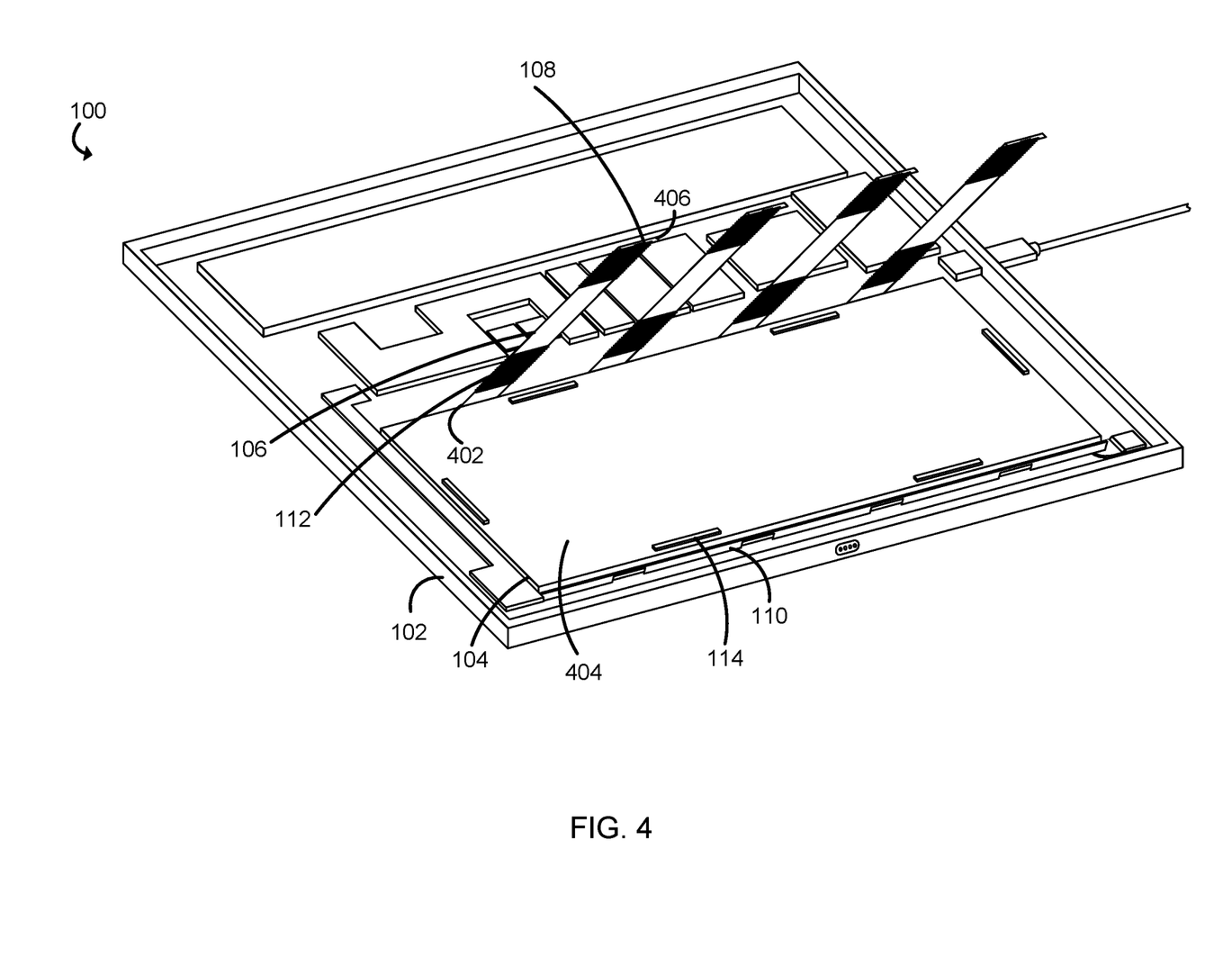
FIG. 4 illustrates a block diagram of the straps of the computing device of FIG. 1 being connected or disconnected.

In order to install the battery 104, the battery 104 can be placed in an opening of the computing device 100 configured to receive the battery 104. The straps 106 can then be connected at a first end 402 to, e.g., a bracket, as shown in FIG. 4. The straps 106 are placed over the top surface of the battery 104, and the clips 108 at the other end of the straps 106 are connected to a bracket 110. In the illustrative embodiment, the straps 106 are attached at the first end 402 using a clip 108 in a similar manner as the other end of the straps 106. In other embodiments, the different ends of the straps 106 may be connected in different ways. It should be appreciated that the straps 106 and battery 104 can be easily removed (as long as the user or person servicing the computing device 100 has access to the interior of the computing device 100). For example, in one embodiment, an old battery 104 can be replaced by removing the straps 106 by unclipping one or both ends, removing the old battery 104, inserting a new battery 104, and then securing the battery by clipping the straps 106 back on or clipping new straps 106 back on. Accordingly, the process for replacing an old battery 104 is simpler than one that is attached using glue or pressure-sensitive adhesive (PSA), as no sticky residue is required to be removed and replaced.

Figure 5:
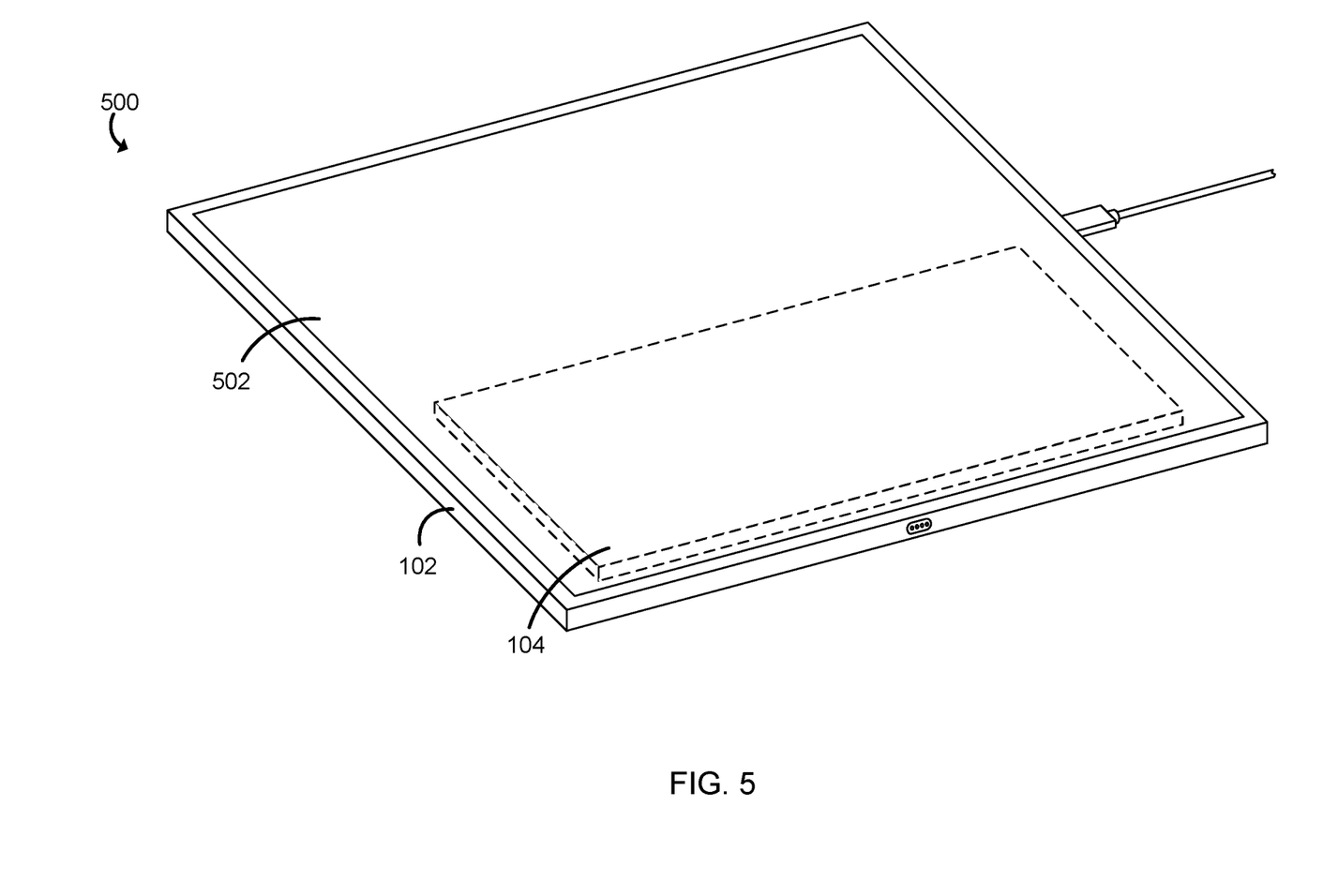
FIG. 5 illustrates a block diagram of one embodiment of a tablet computing device with straps to hold a battery in place.
Figure 6:
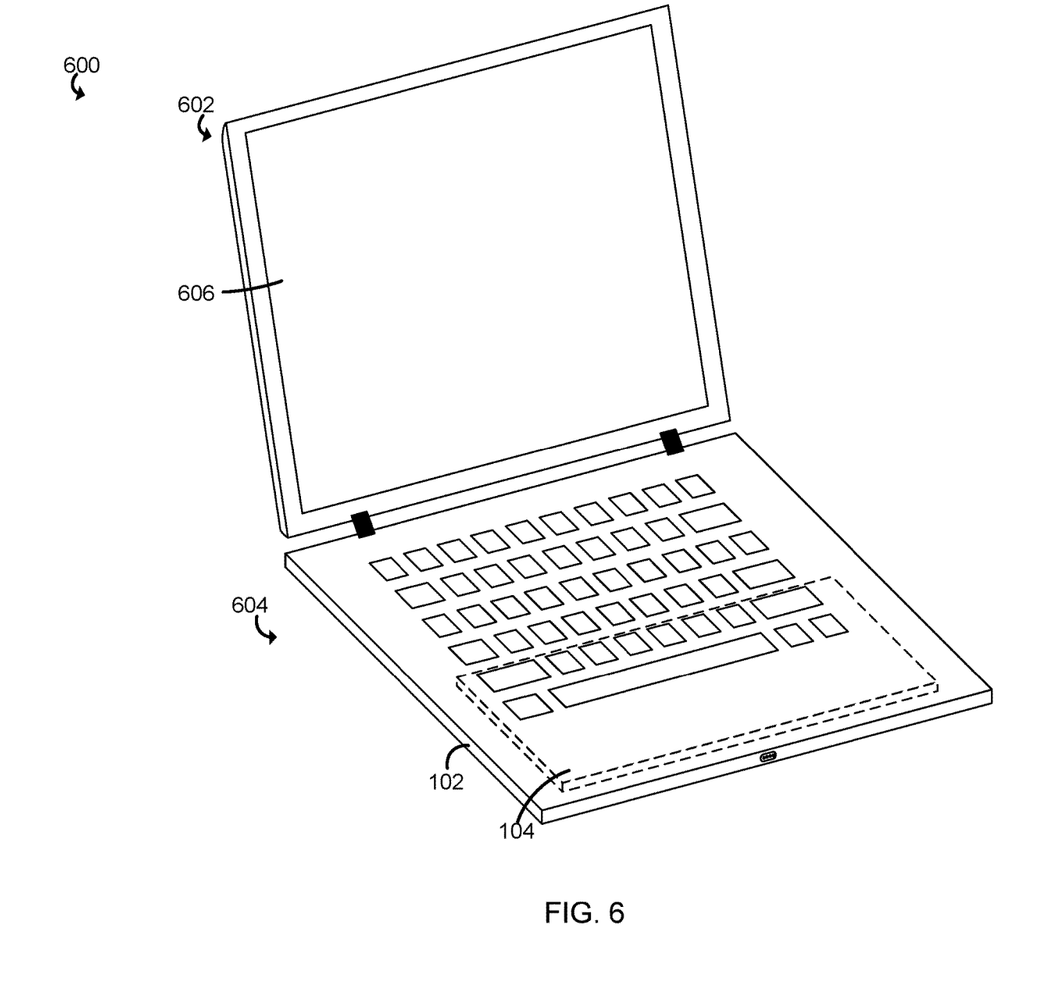
FIG. 6 illustrates a block diagram of one embodiment of a laptop computing device with straps to hold a battery in place.

The illustrative computing device 100 may be any suitable computing device 100 that can benefit from efficient use of space by a battery retention mechanism. For example, the computing device 100 may be a mobile computing device, a laptop, a cell phone, a smart watch, a personal fitness device, a tablet device, a wearable computer, a handset, a messaging device, a camera device, and/or any other suitable computing device. For example, in one embodiment shown in FIG. 5, the computing device 100 may be embodied as a mobile computing device 500 (e.g., a cell phone or tablet device), with a touchscreen display 502 covering the battery 104. In another embodiment shown in FIG. 6, the computing device 100 may be embodied as a laptop 600, with a base portion 604 including the chassis 102 and battery 104 that is connected to a lid portion 602 that includes a touchscreen display 606.

The computing device 100 may include additional components, such as a processor unit, a memory, a microphone, a speaker, an antenna, a power connector, a universal serial bus (USB connector), a keyboard, a trackpad, etc. The computing device 100 may also include various interconnects, such as power connections for the battery 104 to power components such as the process and memory, power connections to charge the battery 104 from an external power supply, and interconnects to transfer data between various components of the computing device 100.

In the illustrative embodiment, the chassis 102 is aluminum. In other embodiments, the chassis may be made of any suitable material, such as iron, steel, plastic, etc. The illustrative chassis 102 provides a rigid body for the computing device 100 and houses components inside the computing device 100. In some embodiments, the chassis 102 may form some or all of a case or housing of the computing device 100. For example, in one embodiment, the chassis 102 may form a bottom surface of the computing device 100 as well as four sides of the computing device, with a display on a top surface of the computing device 100. In such embodiments, the chassis 102 may have a removable panel allowing access to the battery 104 for service. In other embodiments, the chassis 102 may not form part of a top or bottom surface. For example, in some embodiments, the computing device 100 may have a bottom cover underneath the battery 104 and a display or top cover on top of the battery 104 that are each separate from the chassis 102. In the illustrative embodiment, the computing device 100 has a housing or case that contains components of the computing device 100, such as the battery 104, a processor unit, a memory, etc. The housing or case may form a part of or otherwise include some components of the computing device 100, such as the chassis 102, a display, etc.

In the illustrative embodiment, the battery 104 is a lithium-ion polymer battery. In other embodiments, other battery types may be used. The illustrative battery 104 is a flat, rectangular shape, as shown in FIG. 1. In other embodiments, the battery 104 may have a different shape. For example, the battery may be flat with an "L" or "C" shape. In other embodiments, the battery 104 may be in a cylindrical shape. The battery 104 may have any suitable capacity, such as 100-5,000 milliamp-hours. The illustrative battery 104 has a width of 80 millimeters, a length of 275 millimeters, and a height of 5 millimeters. In other embodiments, the battery 104 may have any suitable dimensions, such as a width of 5-500 millimeters, a length of 5-500 millimeters, and a height of 1-20 millimeters. The illustrative battery 104 may swell, increasing the height up to, e.g., 8%.

The illustrative strap 106 is a thermoplastic polyurethane-based elastic material. In other embodiments, the straps 106 may be made from a different material, such as polytetrafluoroethylene (PTFE), plastic, metal, etc. In the illustrative embodiment, the strap 106 has a length slightly longer than the width of the battery of 80 millimeters. The illustrative strap 106 has a width of 5 millimeters and a thickness of 100 micrometers. In other embodiments, the strap may have different dimensions. For example, the length of the strap 106 may be slightly longer than the width of the battery 104 (e.g., 6-510 millimeters), the width of the strap 106 may be 1-20 millimeters, and the thickness of the strap 106 may be 25 to 200 micrometers. The illustrative strap 106 has a modulus at 100% elongation of 325 psi, a tensile strength of at least 1,500 psi, and an elongation percentage of at least 500%.

In the illustrative embodiment, the ridges 112 are configured to contact both the battery 104 and the component spaced apart from the battery 104 (e.g., a display, a case, a housing, etc.). As such, the ridges 112 may have a height equal to or less than the space allowed for the battery 104 to swell. For example, in the illustrative embodiment the height of the ridges 112 may be about 8% of the height of the battery 104, or 400 micrometers. The height of the ridges 112 may be any suitable height, such as 100-600 micrometers.

The clip 108 on the end of the strap 106 may be any suitable material, such as metal or plastic. In the illustrative embodiment, the clip 108 is attached to the strap 106 using insert molding. In other embodiments, the clip 108 may be attached in a different manner.

The bracket 110 is configured to mate with the clip 108 and hold the clip 108 in place, thereby holding the strap 106 and the battery 104 in place. The illustrative bracket 110 may form a part of or otherwise be mechanically coupled to the chassis 102.

The illustrative gaskets 114 may be made of any suitable material, such as polyurethane foam, silicone, rubber, plastic, metal, etc. The gaskets 114 may be any suitable dimensions. In the illustrative embodiment, the gaskets 114 have a width of 2 millimeters, a length of 10 millimeters, and a thickness of 0.4 millimeters. In other embodiments, the gaskets 114 may have, e.g., a width of 0.5-3 millimeters, a length of 2-30 millimeters, and a thickness of 0.1-1 millimeter.

It should be appreciated that, in some embodiments, the strap 106 described above may be used to hold a battery 104 in place in a device other than a computing device 100. Rather, the strap 106 may be used to hold a battery 104 in place in any device in which efficient use of volume by a battery 104 is a concern. For example, in one embodiment, an electric car may include one or more batteries 104 held in place by one or more straps 106 in a similar manner as described above. In some embodiments, some or all of the straps 106 may be oriented in a different direction from that shown in the figures, such as perpendicular to the direction shown in the figures.

Figure 7:
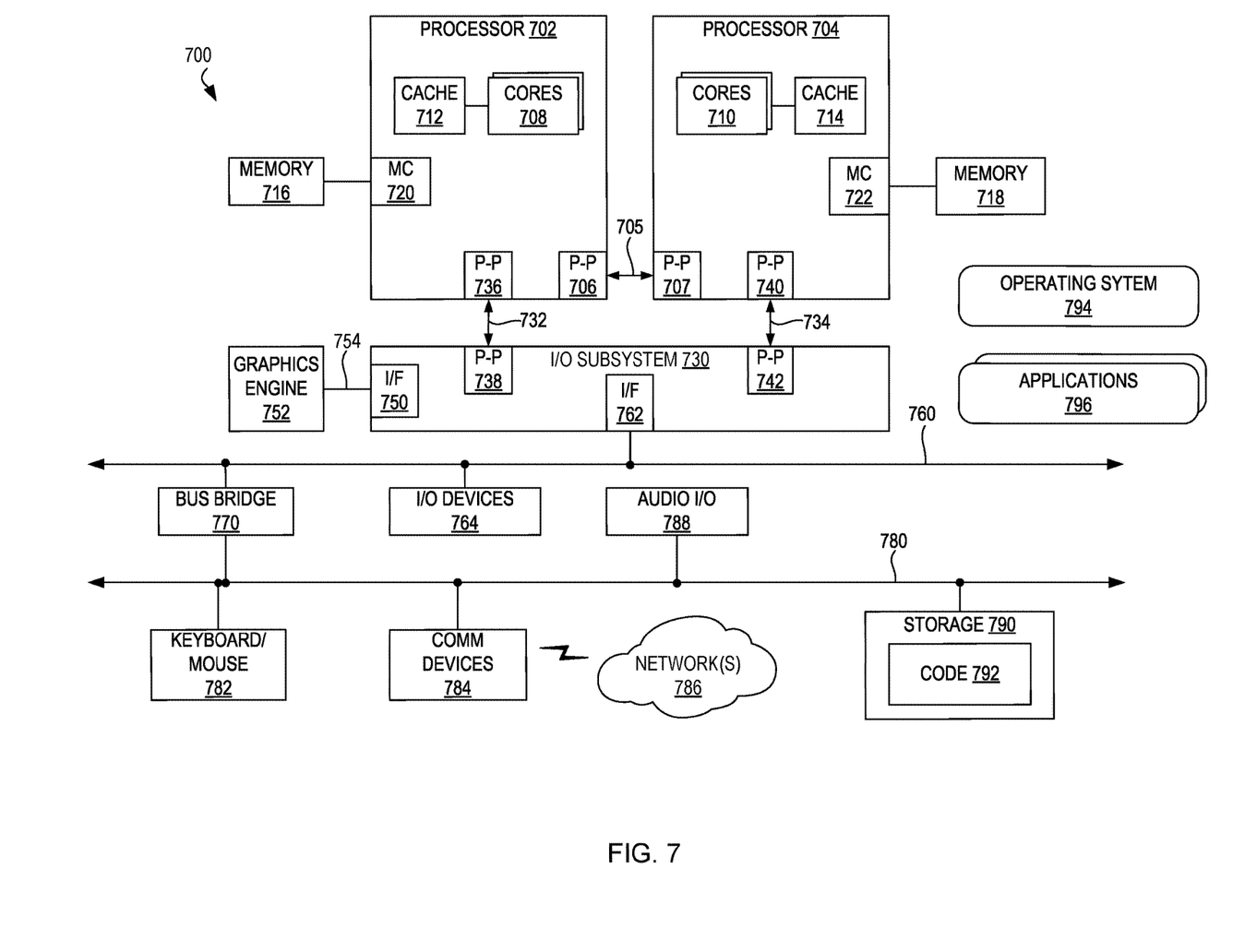
FIG. 7 is a block diagram of an exemplary computing system in which technologies described herein may be implemented.

FIG. 7 is a block diagram of an example computing system in which technologies described herein may be implemented. Generally, components shown in FIG. 7 can communicate with other shown components, although not all connections are shown, for ease of illustration. The computing system 700 is a multiprocessor system comprising a first processor unit 702 and a second processor unit 704 comprising point-to-point (P-P) interconnects. A point-to-point (P-P) interface 706 of the processor unit 702 is coupled to a point-to-point interface 707 of the processor unit 704 via a point-to-point interconnection 705. It is to be understood that any or all of the point-to-point interconnects illustrated in FIG. 7 can be alternatively implemented as a multi-drop bus, and that any or all buses illustrated in FIG. 7 could be replaced by point-to-point interconnects.

The processor units 702 and 704 comprise multiple processor cores. Processor unit 702 comprises processor cores 708 and processor unit 704 comprises processor cores 710. Processor cores 708 and 710 can execute computer-executable instructions.

Processor units 702 and 704 further comprise cache memories 712 and 714, respectively. The cache memories 712 and 714 can store data (e.g., instructions) utilized by one or more components of the processor units 702 and 704, such as the processor cores 708 and 710. The cache memories 712 and 714 can be part of a memory hierarchy for the computing system 700. For example, the cache memories 712 can locally store data that is also stored in a memory 716 to allow for faster access to the data by the processor unit 702. In some embodiments, the cache memories 712 and 714 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processor unit. One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 700 is shown with two processor units, the computing system 700 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 700 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 702 and 704 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component.

Processor units 702 and 704 further comprise memory controller logic (MC) 720 and 722. As shown in FIG. 7, MCs 720 and 722 control memories 716 and 718 coupled to the processor units 702 and 704, respectively. The memories 716 and 718 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 720 and 722 are illustrated as being integrated into the processor units 702 and 704, in alternative embodiments, the MCs can be external to a processor unit.

Processor units 702 and 704 are coupled to an Input/Output (I/O) subsystem 730 via point-to-point interconnections 732 and 734. The point-to-point interconnection 732 connects a point-to-point interface 736 of the processor unit 702 with a point-to-point interface 738 of the I/O subsystem 730, and the point-to-point interconnection 734 connects a point-to-point interface 740 of the processor unit 704 with a point-to-point interface 742 of the I/O subsystem 730. Input/Output subsystem 730 further includes an interface 750 to couple the I/O subsystem 730 to a graphics engine 752. The I/O subsystem 730 and the graphics engine 752 are coupled via a bus 754.

The Input/Output subsystem 730 is further coupled to a first bus 760 via an interface 762. The first bus 760 can be a Peripheral Component Interconnect Express (PCIe) bus or any other type of bus. Various I/O devices 764 can be coupled to the first bus 760. A bus bridge 770 can couple the first bus 760 to a second bus 780. In some embodiments, the second bus 780 can be a low pin count (LPC) bus. Various devices can be coupled to the second bus 780 including, for example, a keyboard/mouse 782, audio I/O devices 788, and a storage device 790, such as a hard disk drive, solid-state drive, or another storage device for storing computer-executable instructions (code) 792 or data. The code 792 can comprise computer-executable instructions for performing methods described herein. Additional components that can be coupled to the second bus 780 include communication device(s) 784, which can provide for communication between the computing system 700 and one or more wired or wireless networks 786 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 784 support wireless communication, the communication devices 784 can comprise wireless communication components coupled to one or more antennas to support communication between the computing system 700 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 700 can comprise removable memory such as flash memory cards (e.g., SD (Secure Digital) cards), memory sticks, Subscriber Identity Module (SIM) cards). The memory in system 700 (including caches 712 and 714, memories 716 and 718, and storage device 790) can store data and/or computer-executable instructions for executing an operating system 794 and application programs 796. Example data includes web pages, text messages, images, sound files, and video data to be sent to and/or received from one or more network servers or other devices by the system 700 via the one or more wired or wireless networks 786, or for use by the system 700. The system 700 can also have access to external memory or storage (not shown) such as external hard drives or cloud-based storage.

The operating system 794 can control the allocation and usage of the components illustrated in FIG. 7 and support the one or more application programs 796. The application programs 796 can include common computing system applications (e.g., email applications, calendars, contact managers, web browsers, messaging applications) as well as other computing applications.

The computing system 700 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 700. External input and output devices can communicate with the system 700 via wired or wireless connections.

In addition, the computing system 700 can provide one or more natural user interfaces (NUIs). For example, the operating system 794 or applications 796 can comprise speech recognition logic as part of a voice user interface that allows a user to operate the system 700 via voice commands. Further, the computing system 700 can comprise input devices and logic that allows a user to interact with computing the system 700 via body, hand or face gestures.

The system 700 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 700 can further comprise one or more additional antennas coupled to one or more additional receivers, transmitters, and/or transceivers to enable additional functions.

It is to be understood that FIG. 7 illustrates only one example computing system architecture. Computing systems based on alternative architectures can be used to implement technologies described herein. For example, instead of the processor units 702 and 704 and the graphics engine 752 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 7. Moreover, the illustrated components in FIG. 7 are not required or all-inclusive, as shown components can be removed and other components added in alternative embodiments.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

EXAMPLES

Illustrative examples of the technologies disclosed herein are provided below. An embodiment of the technologies may include any one or more, and any combination of, the examples described below.

Example 1 includes a computing device comprising a processor unit; a memory; a battery configured to power the processor unit and the memory; and one or more straps extending along a surface of the battery to hold the battery in place.

Example 2 includes the subject matter of Example 1, and wherein each of the one or more straps has a plurality of ridges.

Example 3 includes the subject matter of any of Examples 1 and 2, and wherein each of the plurality of ridges of each of the one or more straps is in contact with the surface of the battery and a component of the computing device spaced apart from the battery by at least 200 micrometers.

Example 4 includes the subject matter of any of Examples 1-3, and further including a plurality of gaskets positioned between the surface of the battery and a case of the computing device.

Example 5 includes the subject matter of any of Examples 1-4, and wherein the plurality of gaskets are positioned near one or more edges of the battery.

Example 6 includes the subject matter of any of Examples 1-5, and wherein each of the one or more straps comprises a clip at an end of the corresponding strap configured to mate with a bracket to hold the corresponding strap in place.

Example 7 includes the subject matter of any of Examples 1-6, and wherein each of the one or more straps comprises a clip at each end of the corresponding strap configured to mate with a bracket to hold the corresponding strap in place.

Example 8 includes the subject matter of any of Examples 1-7, and further including a display.

Example 9 includes the subject matter of any of Examples 1-8, and wherein each of the one or more straps has a thickness less than 100 micrometers.

Example 10 includes a system for battery retention, the system comprising a chassis; a battery positioned in the chassis; and one or more straps configured to extend along a surface of the battery to hold the battery in place in the chassis, wherein each of the one or more straps has a clip configured to mate with a bracket to hold the corresponding strap in place in the chassis, wherein each of the one or more straps has a thickness less than 100 micrometers.

Example 11 includes the subject matter of Example 10, and wherein each of the one or more straps has a plurality of ridges.

Example 12 includes the subject matter of any of Examples 10 and 11, and wherein each of the plurality of ridges of each of the one or more straps is has a height of at least 200 micrometers.

Example 13 includes the subject matter of any of Examples 10-12, and further including a plurality of gaskets to be positioned between the surface of the battery and a case of a computing device.

Example 14 includes the subject matter of any of Examples 10-13, and further including a processor unit; a memory; and the battery.

Example 15 includes a method comprising removing a used battery from a computing device; inserting a new battery into the computing device; and clipping one or more straps extending along a surface of the new battery to hold the new battery in place.

Example 16 includes the subject matter of Example 15, and further including disconnecting the one or more straps before removing the used battery.

Example 17 includes the subject matter of any of Examples 15 and 16, and wherein each of the one or more straps has a plurality of ridges.

Example 18 includes the subject matter of any of Examples 15-17, and wherein, after the one or more straps are clipped into place, each of the plurality of ridges of each of the one or more straps is in contact with the surface of the new battery and a component of the computing device spaced apart from the new battery by at least 200 micrometers.

Example 19 includes the subject matter of any of Examples 15-18, and wherein the used battery is a swollen used battery, the method further comprising removing one or more used straps before removing the used battery, wherein each of the one or more used straps has a plurality of ridges, wherein each of the plurality of ridges of each of the one or more used straps has been at least partially smoothed by swelling of the used battery.

Example 20 includes the subject matter of any of Examples 15-19, and further including securing a plurality of gaskets between the surface of the new battery and a case of the computing device.

Example 21 includes the subject matter of any of Examples 15-20, and wherein each of the plurality of gaskets is positioned near one or more edges of the new battery.

Example 22 includes a system for battery retention, the system comprising a chassis; a battery positioned in the chassis; and means for holding the battery in place in the chassis without adhesive.

Example 23 includes the subject matter of Example 22, and wherein the means for holding the battery in place comprises means for holding the battery in place while allowing space for the battery to swell.

Example 24 includes the subject matter of any of Examples 22 and 23, and further including a processor unit; a memory; and the battery.

The invention claimed is:
1. A computing device comprising:
a processor unit;
a memory;
a battery configured to power the processor unit and the memory; and
one or more straps extending along a surface of the battery to hold the battery in place,
wherein each of the one or more straps has a plurality of ridges, wherein each of the plurality of ridges of each of the one or more straps is in contact with the surface of the battery and a component of the computing device spaced apart from the battery by at least 200 micrometers.

2. The computing device of claim 1, further comprising a plurality of gaskets positioned between the surface of the battery and a case of the computing device.

3. The computing device of claim 2, wherein the plurality of gaskets are positioned near one or more edges of the battery.

4. The computing device of claim 1, wherein each of the one or more straps comprises a clip at an end of the corresponding strap configured to mate with a bracket to hold the corresponding strap in place.

5. The computing device of claim 1, wherein each of the one or more straps comprises a clip at each end of the corresponding strap configured to mate with a bracket to hold the corresponding strap in place.

6. The computing device of claim 1, further comprising a display.

7. The computing device of claim 1, wherein each of the one or more straps has a thickness less than 100 micrometers.

8. The computing device of claim 1, wherein the plurality of ridges extend through a cavity between the battery and the component of the computing device, wherein the cavity has a height of at least 200 micrometers, wherein the cavity has a height of less than 500 micrometers,
wherein the plurality of ridges, in response to a swelling of the battery towards the component of the computing device, are to at least partially deform to accommodate the battery swelling into the cavity.

9. The computing device of claim 1, wherein the component is a display.

10. The computing device of claim 1, wherein the component is a bottom cover or top cover.

11. A system for battery retention, the system comprising:
a mobile computing device comprising:
  a chassis;
  a battery positioned in the chassis of the mobile computing device; and
  one or more straps configured to extend along a surface of the battery to hold the battery in place in the chassis of the mobile computing device,
wherein each of the one or more straps has a clip configured to mate with a bracket to hold the corresponding strap in place in the chassis of the mobile computing device,
wherein each of the one or more straps has a thickness less than 100 micrometers,
wherein each of the one or more straps has a plurality of ridges,
wherein each of the plurality of ridges of each of the one or more straps has a height of at least 200 micrometers, wherein each of the plurality of ridges of each of the one or more straps is in contact with the battery and another component of the mobile computing device spaced apart from the battery.

12. The system of claim 11, further comprising a plurality of gaskets to be positioned between the surface of the battery and a case of the mobile computing device.

13. The system of claim 11, the mobile computing device further comprising:
  a processor unit;
  a memory; and
  the battery.

14. A method comprising:
removing a used battery from a computing device;
inserting a new battery into the computing device; and
clipping one or more straps extending along a surface of the new battery to hold the new battery in place,
wherein each of the one or more straps has a plurality of ridges, wherein the plurality of ridges of each of the one or more straps are to extend through a cavity defined between the new battery and another component of the computing device, wherein the new battery is spaced apart from the other component of the computing device by the one or more straps,
wherein, after the one or more straps are clipped into place, each of the plurality of ridges of each of the one or more straps is in contact with the surface of the new battery and a component of the computing device spaced apart from the new battery by at least 200 micrometers.

15. The method of claim 14, further comprising disconnecting the one or more straps before removing the used battery.

16. The method of claim 14, wherein the used battery is a swollen used battery, the method further comprising:
removing one or more used straps before removing the used battery,
wherein each of the one or more used straps has a plurality of ridges, wherein each of the plurality of ridges of each of the one or more used straps has been at least partially smoothed by swelling of the used battery and by being pressed between the used battery and the other component.

17. The method of claim 14, further comprising securing a plurality of gaskets between the surface of the new battery and a case of the computing device.

18. The method of claim 17, wherein each of the plurality of gaskets is positioned near one or more edges of the new battery.

* * * * *